United States Patent
Shimada et al.

(10) Patent No.: US 7,503,494 B2
(45) Date of Patent: Mar. 17, 2009

(54) OPTICAL DISC APPARATUS AND BARCODE READING METHOD

(75) Inventors: Yoshiaki Shimada, Yokohama (JP); Hideki Otsuka, Mishima (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 0 days.

(21) Appl. No.: 11/751,213

(22) Filed: May 21, 2007

(65) Prior Publication Data

US 2007/0278307 A1 Dec. 6, 2007

(30) Foreign Application Priority Data

May 30, 2006 (JP) ............................. 2006-150485

(51) Int. Cl.
*G06K 7/10* (2006.01)
(52) U.S. Cl. .................... 235/454; 369/47.1; 369/53.22
(58) Field of Classification Search ................ 235/454, 235/462.01; 369/275.4, 52.1, 52.22, 47.1, 369/53.22; 714/758
See application file for complete search history.

(56) References Cited

U.S. PATENT DOCUMENTS

| | | | | |
|---|---|---|---|---|
| 6,945,462 B2 * | 9/2005 | Tsukuda et al. | ........ | 235/462.06 |
| 2005/0169158 A1 * | 8/2005 | Abe et al. | ................ | 369/275.3 |
| 2006/0146680 A1 * | 7/2006 | MacDonald et al. | ........ | 369/100 |
| 2007/0147614 A1 * | 6/2007 | Kelly et al. | ................. | 380/270 |

FOREIGN PATENT DOCUMENTS

| | | |
|---|---|---|
| JP | 5-165994 | 7/1993 |
| JP | 7-200712 | 8/1995 |
| JP | 11-328857 | 11/1999 |
| JP | 2000-132903 | 5/2000 |
| JP | 2001-297443 | 10/2001 |

* cited by examiner

*Primary Examiner*—Daniel A Hess
(74) *Attorney, Agent, or Firm*—Oblon, Spivak, McClelland, Maier & Neustadt, P.C.

(57) ABSTRACT

An optical disc apparatus which reads a barcode recorded on a predetermined area of an optical disc, includes a reading unit which reads the barcode from a plurality of tracks on the predetermined area of the optical disc, and a barcode data decoding unit which decodes barcode output data from a cumulative value of the barcode data of the plurality of tracks, which is read by the reading unit.

2 Claims, 4 Drawing Sheets

Reflective part   Non-reflective part

OPTICAL DISC APPARATUS AND BARCODE READING METHOD

CROSS-REFERENCE TO RELATED APPLICATIONS

This application is based upon and claims the benefit of priority from prior Japanese Patent Application No. 2006-150485, filed May 30, 2006, the entire contents of which are incorporated herein by reference.

BACKGROUND OF THE INVENTION

1. Field of the Invention

The present invention relates to an optical disc apparatus which reads a barcode recorded on an optical disc such as a Digital Versatile Disc (DVD) or a High Definition Digital Versatile Disc (HD-DVD), and a barcode reading method.

2. Description of the Related Art

An optical disc apparatus executes reading of a barcode which is recorded on a burst cutting area (BCA) of an optical disc such as a DVD or an HD-DVD (see, e.g. Jpn. Pat. Appln. KOKAI Publication No. 11-328857).

A data reading apparatus disclosed in KOKAI No. 11-328857 comprises a pickup which forms a beam spot on a disc surface by a pickup laser and generates a BCA reproduction signal on the basis of reflected light from the disc surface; an error signal generating unit which generates a focus error signal and a tracking error signal on the basis of a signal from the pickup; and a servo mechanism which controls tracking and focusing on the basis of the error signals.

The data reading apparatus converts the BCA reproduction signal, which is generated from the pickup, to a digital signal, and generates a reproduction pulse. When the reproduction pulse, which has a predetermined pulse width or more, is detected, the data reading apparatus generates a detection pulse, and reproduces BCA data on the basis of the detection pulse.

In the prior-art data reading apparatus, a beam spot is formed on the disc surface by the pickup laser, and the BCA reproduction signal is generated on the basis of the reflected beam. The prior-art document is silent on which position of the BCA is traced, that is, what control is executed for the pickup head when the BCA is read.

In the prior-art data reading apparatus, if a stain, a fingerprint or a flaw is present on a location of the BCA that is to be traced by the pickup laser, an erroneous BCA reproduction signal is generated. For example, if a stain is present on a part which is normally a reflective part, a BCA reproduction signal, which is similar to a signal produced from a non-reflective part, would be generated. As a result, there arises such a problem that erroneous barcode data is read.

BRIEF SUMMARY OF THE INVENTION

According to an aspect of the present invention, there is provided an optical disc apparatus which reads a barcode recorded on a predetermined area of an optical disc, comprising: a reading unit which reads the barcode from a plurality of tracks on the predetermined area of the optical disc; and a barcode data decoding unit which decodes barcode output data from a cumulative value of the barcode data of the plurality of tracks, which is read by the reading unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
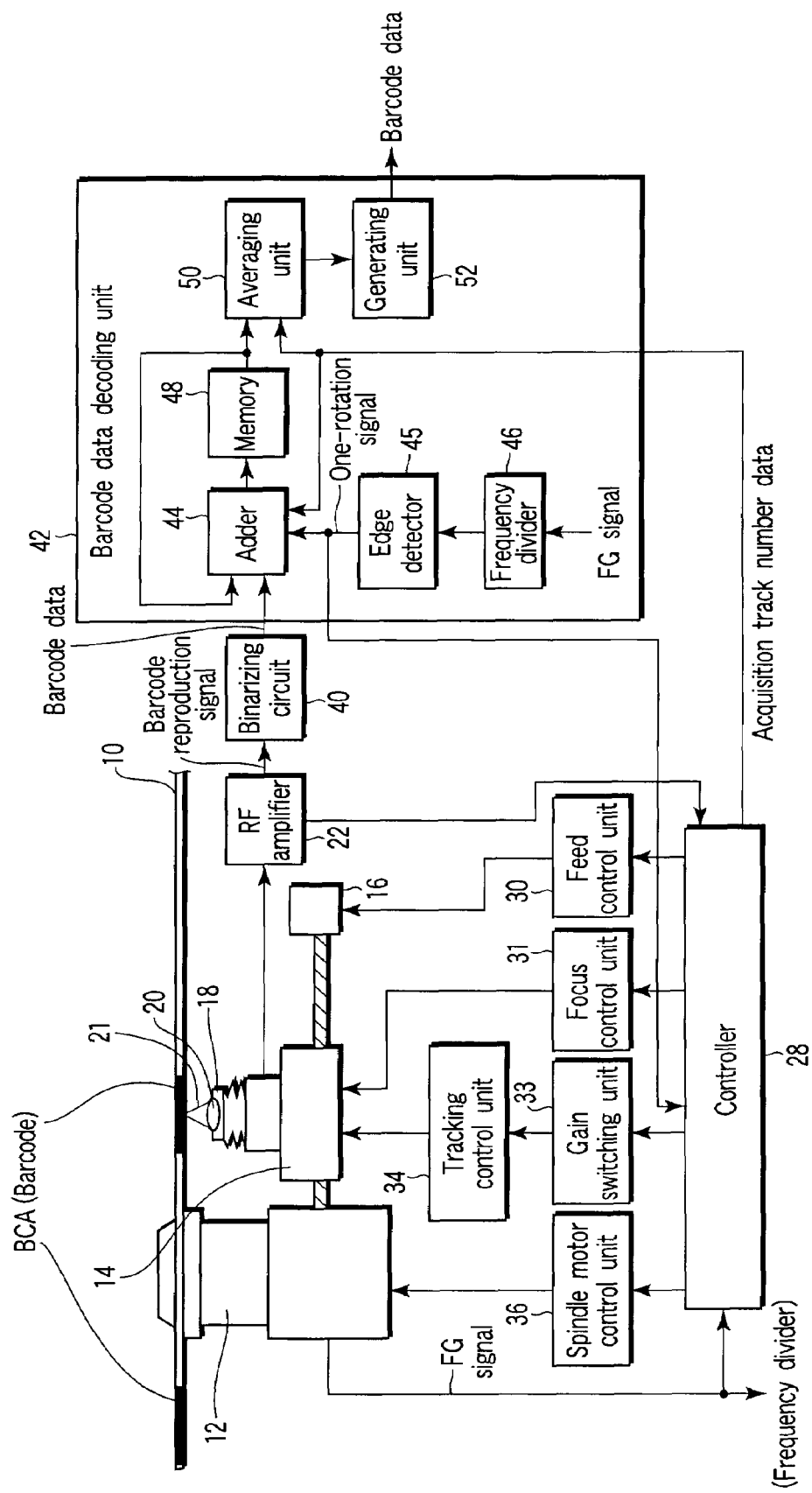
FIG. 1 is a block diagram showing the structure of an optical disc apparatus according to an embodiment of the invention.

FIG. 1 is a block diagram showing the structure of an optical disc apparatus according to the embodiment.

In FIG. 1, an optical disc 10 is, for instance, a DVD or an HD-DVD. The optical disc 10 is attached to a spindle motor 12. The optical disc 10 is rotated when the spindle motor 12 is driven.

Figure 2:
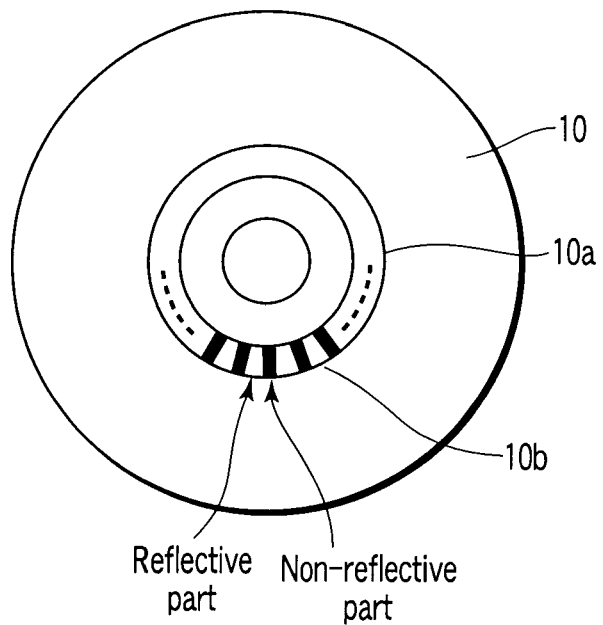
FIG. 2 shows a barcode that is recorded on an optical disc.

As shown in FIG. 2, a burst cutting area (BCA) 10a is provided on a radially inward peripheral region of the optical disc 10. A barcode 10b is concentrically formed on the BCA 10a. The barcode 10b includes stripe parts (non-reflective parts), where a reflective film is cut out, and white parts (reflective parts). The stripe part is detected as a black part since the stripe part passes a pickup laser beam which is emitted from a optical pickup head 14.

Recording and reproduction of information on the optical disc 10 are executed by a pickup laser beam 21 that is output from the optical pickup head (PUH) 14. The optical pickup head 14 is held by a thread mechanism (not shown) so as to be movable in the radial direction of the optical disc 10.

The optical pickup head 14 includes a laser diode, a collimator lens, a beam splitter, an objective lens 20, a cylindrical lens, photodetectors (e.g., four photodetectors), and a lens position sensor. The laser diode is driven by an auto power control circuit (APC) (not shown), and outputs the pickup laser beam 21.

The pickup laser beam 21, which is output from the laser diode, travels through the collimator lens, beam splitter and objective lens 20 and falls on a recording surface of the optical disc 10. Reflective light from the optical disc 10 travels through the objective lens 20, beam splitter and cylindrical lens, and is guided to the photodetectors. The photodetectors output a detection signal, which corresponds to the input light amount, to an RF amplifier 22.

The optical pickup head 14 is provided with a lens actuator 18 for adjusting focusing by moving the objective lens 20 in a focusing direction (an optical-axis direction of the lens), and for adjusting tracking by shifting the objective lens 20 in a tracking direction (a radial direction of the optical disc 10). The lens actuator 18 is composed of driving components such as a wire suspension, a magnetic circuit and a driving coil, which are not shown. Since little friction and vibration occurs due to the driving of the lens actuator 18, the lens actuator 18 can execute a fine position control.

The RF amplifier 22 processes the detection signal from the photodetectors (not shown) and outputs a processed signal. For example, the RF amplifier 22 generates and outputs a tracking error signal which is indicative of an error between a beam spot center of the pickup laser beam 21 and a track center, a focus error signal which is indicative of an error from a just-focus point, and an RF signal in which signals from the four photodetectors are added. When the barcode 10b recorded on the BCA 10a of the optical disc 10 is read, the RF signal output from the RF amplifier 22 is input to a binarizing circuit 40 as a barcode reproduction signal.

A controller 28 is composed of a processor, memories (e.g., RAM, ROM), etc. Various programs stored in the memories are executed by the processor, and thereby the controller 28 executes an overall control of the apparatus. The controller 28 in this embodiment executes a barcode generating program, thereby carrying out a process for reading the barcode 10b recorded on the BCA 10a of the optical disc 10.

In addition, the controller 28 controls, on the basis of a plurality of signals generated from the RF amplifier 22, a feed control unit 30, a focus control unit 31, a gain switching unit 33, a spindle motor control unit 36, and an APC circuit (not shown).

The feed control unit 30 drives a feed motor 16 in accordance with an instruction from the controller 28, thereby moving the optical pickup head 14 to a position where the optical pickup head 14 faces a predetermined region in the radial direction of the optical disc 10.

The focus control unit 31 drives the lens actuator 18 by a control corresponding to the focus error signal from the controller 28. Specifically, the focus control unit 31 drives the lens actuator 18 to move the objective lens 20 in the focusing direction, thereby executing a focus control.

The gain switching unit 33 outputs a gain setting value, which is indicative of a driving control amount, to a tracking control unit 34, by a control corresponding to the tracking error signal from the controller 28. In the present embodiment, in the case where the reading of the barcode 10b that is recorded on the BCA 10a of the optical disc 10 is executed, the gain switching unit 33 switches the gain setting value each time the barcode data corresponding to a single circle of the optical disc 10 is read. The gain switching unit 33 detects that one rotation of the optical disc 10 is completed, on the basis of a one-rotation signal which is output from an edge detector 45 (to be described later). Specifically, upon receiving the one-rotation signal, the gain switching unit 33 determines that the barcode data corresponding to a single circle of the optical disc 10 is read, and varies the gain setting value.

The tracking control unit 34 drives the lens actuator 18 in accordance with the gain setting value that is input from the gain switching unit 33, thereby shifting the objective lens 20 in the radial direction of the optical disc 10. Specifically, the tracking control unit 34 varies the position of the beam spot of the pickup laser beam 21 on the optical disc 10, which is emitted through the objective lens 20, in the radial direction of the optical disc 10. In the case where the barcode 10b that is recorded on the BCA 10a of the optical disc 10 is read, the gain setting value is switched each time the barcode data corresponding to a single circle of the optical disc 10 is read. Thus, the barcode 10b is read from a plurality of tracks within a range of the BCA 10a in which the barcode 10b is recorded.

The spindle motor control unit 36 drives the spindle motor 12 in accordance with an instruction from the controller 28.

The spindle motor 12 is driven by the spindle motor control unit 36, thereby rotating the optical disc 10 which is attached to the spindle motor 12. The spindle motor 12 is provided with a frequency generator (not shown) which generates a signal in accordance with a rotational angle. The frequency generator outputs an FG signal corresponding to a rotation angle, e.g., 18 FG signals per rotation, by making use of, e.g., an electromotive force of a field coil of the stator or an output of a Hall element which detects a rotation angle of a magnet of the rotor. The FG signals, which are output from the spindle motor 12, are input to the controller 28 and a frequency divider 46 of the barcode data decoding unit 42.

The binarizing circuit 40 binarizes the barcode reproduction signal (RF signal) that is output from the RF amplifier 22, generates barcode data, and outputs the barcode data to the barcode data decoding unit 42. Specifically, the binarizing circuit 40 compares the barcode reproduction signal with a preset reference level, and generates barcode data (binary pulses) in which a component of the barcode reproduction signal, which is higher than the reference level, is set at "1", and a component of the barcode reproduction signal, which is equal to or lower than the reference level, is set at "0".

Based on the barcode data that is output from the binarizing circuit 40, the barcode data decoding unit 42 executes a barcode decoding process which enables exact reading of the barcode data even when a stain, etc., is present on the barcode. In the optical disc apparatus of the present embodiment, barcode data of the barcode 10b recorded on the BCA 10a is read from a plurality of tracks, and barcode data is generated on the basis of the barcode data that is read from the plural tracks.

The barcode data decoding unit 42 includes an adder 44, an edge detector 45, a frequency divider 46, a memory 48, an averaging unit 50, and a generating unit 52.

The adder 44 generates write data by adding the barcode data corresponding to the single circle of the optical disc 10, which is output from the binarizing circuit 40, and the barcode data (read data) corresponding to the single circle of the optical disc 10, which is previously stored in the memory 48. The adder 44 re-stores the generated write data in the memory 48. Specifically, the adder 44 stores the barcode data of the plural tracks, which is output from the binarizing circuit 40, in the memory 48, thereby storing a cumulative value of the barcode data in the memory 48.

The frequency divider 46 frequency-divides the FG signal that is output from the spindle motor 12, and generates, e.g., a one-rotation signal which indicates that a single rotation of the spindle motor 12 is completed. The edge detector 45 detects the one-rotation signal that is generated by the frequency divider 46, and outputs the one-rotation signal to the adder 44. The adder 44 detects, at the timing of the one-rotation signal, the barcode data corresponding to the single circle of the optical disc 10, which is input from the binarizing circuit 40. The adder 44 successively adds barcode data for plural tracks corresponding to acquisition track number data which is input from the controller 28. The acquisition track number data is indicative of the number of times of reading which is executed for the barcode 10b recorded on the BCA 10a.

The barcode data, which is output from the binarizing circuit 40, is cumulatively stored in the memory 48 by the adder 44.

The averaging unit 50 averages the barcode data for plural tracks, which is stored in the memory 48, by using the acquisition track number data that is input from the controller 28.

The generating unit 52 generates barcode data on the basis of the average value of the barcode data, which is averaged by the averaging unit 50. Specifically, the generating unit 52 compares the average value of the barcode data with a preset reference level, in units of a clock of a binary pulse, and generates barcode data (binary pulses) by setting a component of the average value, which is higher than the reference level, to be "1", and setting a component of the average value, which is equal to or lower than the reference level, to be "0". The barcode data, which is generated by the generating unit 52, is ultimate barcode data relating to the barcode 10b recorded on the optical disc 10.

Figure 3:
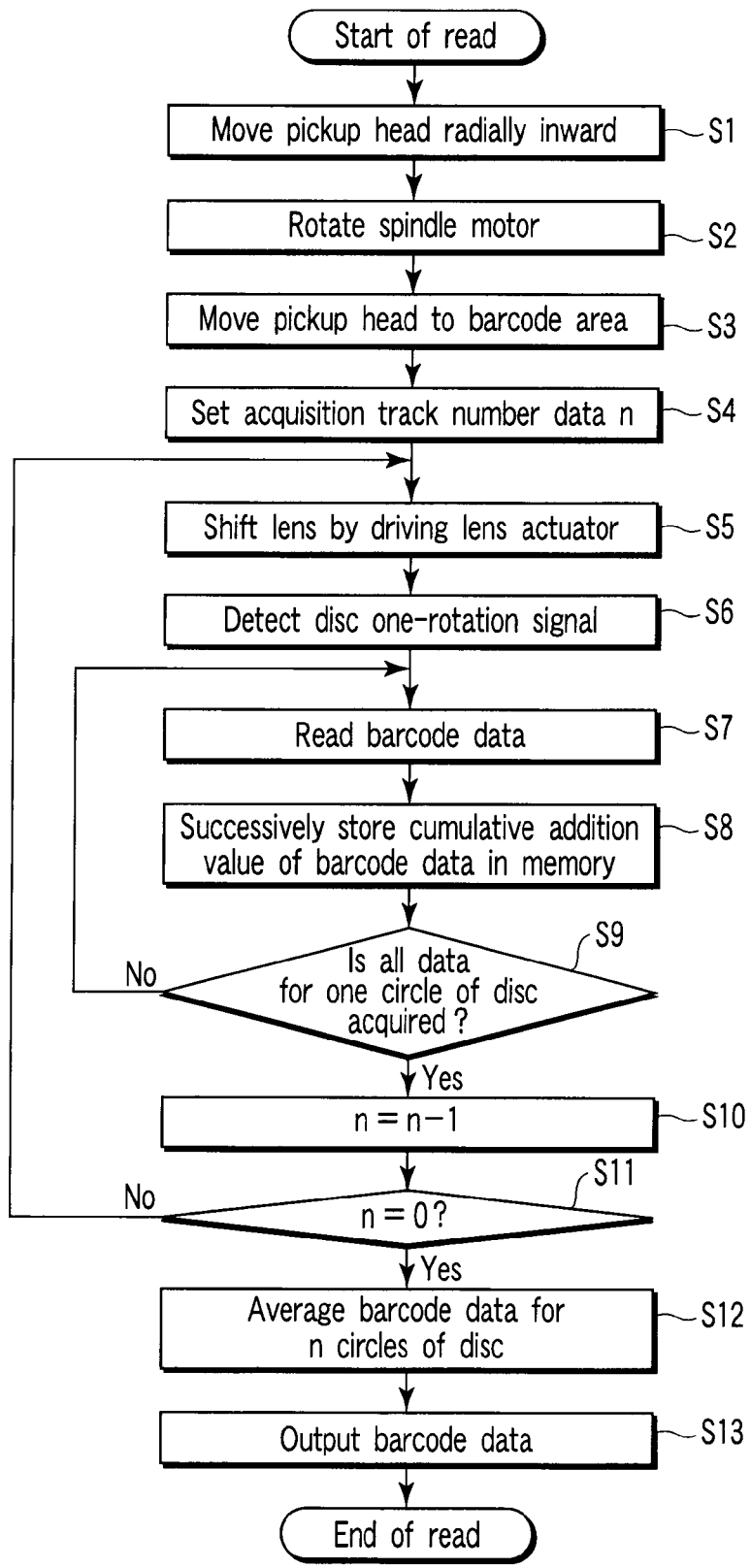
FIG. 3 is a flowchart illustrating a barcode reading operation of the optical disc apparatus according to the embodiment.

Next, the barcode reading operation of the optical disc apparatus according to the embodiment is described with reference to a flowchart of FIG. 3.

When the controller 28 starts reading the barcode recorded on the optical disc 10, the controller 28 controls the feed control unit 30 and moves the optical pickup head 14 in a radially inward direction (step S1). Under the control of the controller 28, the feed control unit 30 drives the feed motor 16 and moves the optical pickup head 14 toward the BCA 10a.

In addition, the controller 28 controls the spindle motor control unit 36 and rotates the spindle motor 12 (step S2). Under the control of the controller 28, the spindle motor control unit 36 drives the spindle motor 12 so that the spindle motor 12 may rotate at a fixed speed.

Subsequently, the controller 28 controls the feed control unit 30 and stops the optical pickup head 14 at a position where the optical pickup head 14 faces a region of the BCA 10a where the barcode 10b is recorded (step S3). For example, it is assumed that the controller 28 moves the optical pickup head 14 to a position where the pickup laser beam 21, which is vertically emitted from the optical pickup head 14, is radiated on the substantially central point of the width of the barcode 10b (in the radial direction of the optical disc 10) which is recorded on the BCA 10a.

Figure 4:
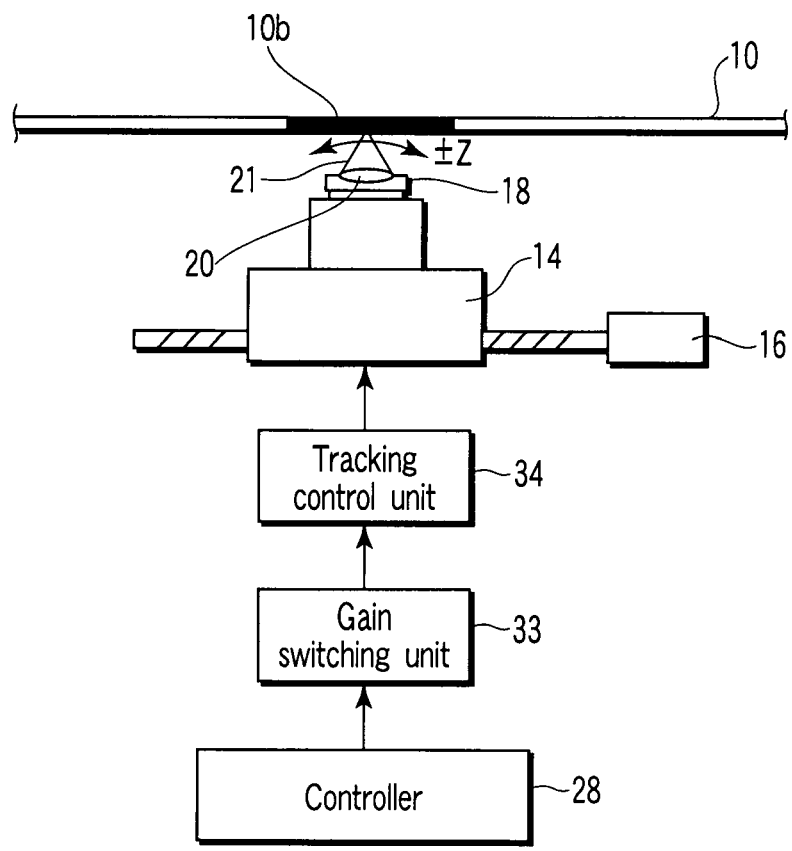
FIG. 4 shows a relationship between an optical disc and an objective lens in the embodiment.

FIG. 4 shows a state in which the optical pickup head 14 is moved to the position where the optical pickup head 14 faces the BCA 10a on which the barcode 10b is recorded.

Assuming that the position of the objective lens 20 at the time the pickup laser beam 21 is vertically emitted on the optical disc 10 is an initial position, the controller 28 shifts the objective lens 20 in a range of ±z (hereinafter referred to as "reading range") in the radial direction of the optical disc 10. The range (±z) of shift of the objective lens 20 is set by subtracting a predetermined tolerable eccentricity amount from the width (the length in the radial direction of the optical disc 10) of the barcode 10b recorded on the BCA 10a of the optical disc 10. It is desirable, however, that the reading range be as large as possible. The tolerable eccentricity amount is a maximum tolerable eccentricity amount for the optical disc 10. Specifically, in the case where the optical disc 10 is eccentric, the pickup laser beam 21 is prevented from falling on a part where the barcode 10b is not recorded, even if the objective lens 20 is shifted in the range of ±z.

The controller 28 controls the gain switching unit 33 to vary the gain setting value each time the barcode data for a single circle of the optical disc 10 is read from the optical disc 10. In accordance with the gain setting value that is set by the gain switching unit 33, the tracking control unit 34 drives the lens actuator 18 and shifts the objective lens 20 in the radial direction of the optical disc 10. Thereby, the pickup laser beam 21, which is emitted via the objective lens 20, is radiated on different track positions of the optical disc 10.

The controller 28 is configured to adjust the shift amount of the objective lens 20 for changing tracks, in accordance with the number of times of reading of the barcode 10b, that is, in accordance with the acquisition track number. For example, the controller 28 sets the shift amount of the objective lens 20 so that the barcode 10b can be read at intervals, which are obtained by equally dividing the reading range by the acquisition track number.

When the objective lens 20 is to be shifted, the controller 28 shifts the objective lens 20 from the initial position of the objective lens 20 so that the pickup laser beam 21 may be radiated on the track position at the radially inward end of the reading range on the optical disc 10. Each time the barcode data for one circle of the disc is read from the radially inward side, the controller 28 successively shifts the objective lens 20 in the radially outward direction. Alternatively, the objective lens 20 may first be shifted so that the pickup laser beam 21 may be radiated on the track position at the radially outward end of the reading range, and then the objective lens 20 may successively be shifted in the radially inward direction. Further, the objective lens 20 may be alternately shifted from the initial position in the radially inward direction and in the radially outward direction of the optical disc 10 with different shift amounts.

Subsequently, the controller 28 sets acquisition track number data (n) and outputs the acquisition track number data (n) to the barcode data decoding unit 42 (step S4). For the purpose of simple description, it is assumed that the controller 28 outputs acquisition track number data "10". Upon receiving the acquisition track number data, the barcode data decoding unit 42 sets the acquisition track number data (n=10) in the averaging unit 50 and adder 44.

Next, the controller 28 drives the lens actuator 18 via the gain switching unit 33 and tracking control unit 34, and shifts the objective lens 20 so that the pickup laser beam 21 may be radiated on the first track position in the reading range (step S5).

When the barcode 10b recorded on the BCA 10a of the optical disc 10 is to be read, the optical pickup head 14 emits the pickup laser beam 21 through the objective lens 20. The optical pickup head 14 receives reflective light from the optical disc 10, converts the reflective light to an electric signal, and outputs the electric signal to the RF amplifier 22. Based on the signal that is input from the optical pickup head 14, the RF amplifier 22 generates a barcode reproduction signal which varies in accordance with the pattern of the barcode, and outputs the barcode reproduction signal to the binarizing circuit 40. The binarizing circuit 40 compares the barcode reproduction signal, which is input from the RF amplifier 22, with a preset reference level, thereby generating barcode data and outputting the barcode data to the barcode decoding unit 42.

On the other hand, the spindle motor 12 is driven by the spindle motor control unit 36, and outputs FG signals. The FG signals that are output from the spindle motor 12 are input to the controller 28 and the frequency divider 46 of the barcode data decoding unit 42. The frequency divider 46 frequency-divides the FG signals and generates a one-rotation signal that indicates that the spindle motor 12 completes a single rotation. The edge detector 45 detects the one-rotation signal that is generated by the frequency divider 46, and outputs the one-rotation signal to the adder 44. If the one-rotation signal is input to the adder 44 (step S6), the adder 44 begins reading the barcode data that is output from the binarizing circuit 40.

The adder 44 adds the barcode data (binary pulse value), which is output from the binarizing circuit 40, and the barcode data (binary pulse value) that is read out of the memory 48 and is read at the same clock timing, and stores the added data in the memory 48 (steps S7, S8). Assume that the memory 48 prestores, as a default value, "All 0" data which corresponds to barcode data for one circle of the optical disc.

The adder 44 stores the added barcode data in the memory 48 until the next one-rotation detection signal is input.

If the next one-rotation detection signal is input, the controller 28 detects that the storage of the barcode data for one circle of the optical disc is completed (Yes in step S9), and the controller 2 updates the track for reading the barcode data. For example, the controller 28 decrements the value of the acquisition track number data n by −1 (step S10).

If the condition, n=0, is not determined, that is, if the barcode reading from all the tracks is not completed (No in step S11), the controller 28 drives the lens actuator 18 via the gain switching unit 33 and tracking control unit 34, and shifts the objective lens 20 so that the pickup laser beam 21 may be radiated on the next track position in the reading range (step S5).

In the same manner as described above, if the one-rotation detection signal is input from the edge detector 45 to the adder 44 (step S6), the adder 44 acquires the barcode data relating to the next track position from the binarizing circuit 40, adds the barcode data to the barcode data that is previously stored in the memory 48, and stores the added data in the memory 48 (steps S7, S8).

Similarly, until the acquisition track number data n becomes "0", the objective lens 20 is shifted to change the track, and the barcode data is read at each of the track positions. The adder 44 adds the barcode data, which is read from each track, and the barcode data that is previously stored in the memory 48, and re-stores the added data in the memory 48. If the barcode reading is completed with respect to all the tracks (n=10 tracks in this example), the cumulative value of the barcode data, which is read from all the tracks, is recorded in the memory 48.

If the cumulative values of the barcode data, which are read from all the tracks, are recorded in the memory 48 (Yes in step S11), the averaging unit 50 reads out the barcode data from the memory 48 and averages the barcode data by the acquisition track number data (n). Specifically, in this example, the cumulative values of the barcode data, which are read from the 10 tracks, are divided by 10, and an average value of barcode data is obtained on a clock-by-clock basis.

The generating unit 52 compares the average value of the barcode data in each clock unit, which is calculated by the averaging unit 50, with a preset reference value, and generates and outputs ultimate barcode data which represents the barcode 10b recorded on the optical disc 10. The reference value is set at, e.g., 0.5. Accordingly, the generating unit 52 generates barcode data (binary pulses) in which data at a clock with an average value greater than 0.5 is set at "1" and data at a clock with an average value not greater than 0.5 is set at "0".

Figure 5:
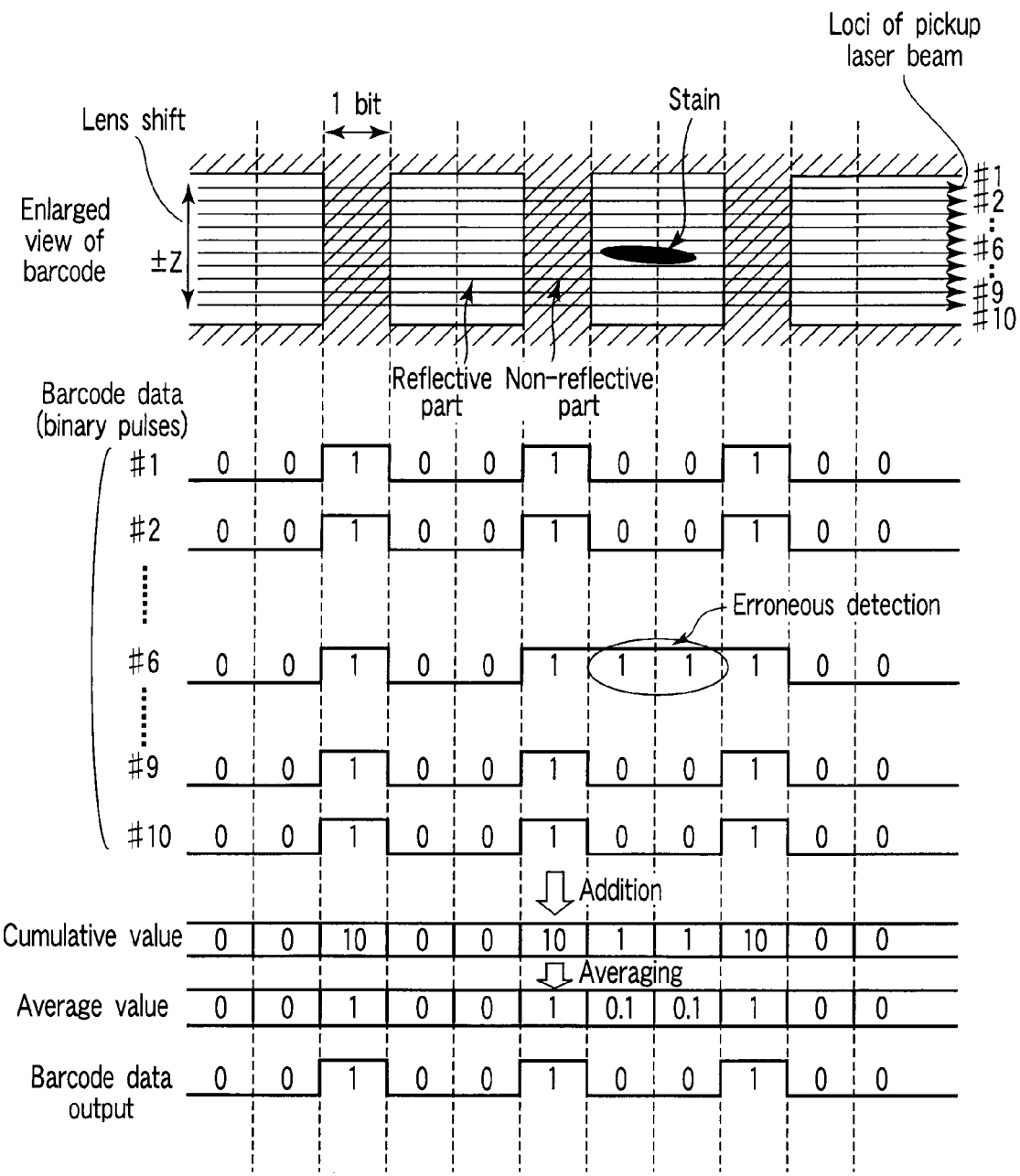
FIG. 5 illustrates a process in a barcode data decoding unit in the embodiment.

FIG. 5 illustrates the process that is executed in the barcode data decoding unit 42.

An enlarged view of a barcode in FIG. 5 shows a part of the barcode 10b recorded on the BCA 10a. The barcode 10b includes reflective parts and non-reflective parts. In this embodiment, the number of tracks, from which the barcode 10b is read, is set at 10. Arrows #1 to #10 in the enlarged view of the barcode indicate loci (tracks) of the pickup laser beam 21 at the time of reading the barcode 10b. The barcode data of the tracks #1 to #10 can be read by shifting the objective lens 20 stepwise in the range of ±z in the radial direction of the optical disc 10. In the enlarged view of the barcode in FIG. 5, a stain is present on the track #6, for example.

As shown in FIG. 5, barcode data corresponding to the pattern (reflective parts & non-reflective parts) of the barcode 10b is obtained from the tracks #1 to #5 and the tracks #7 to #10. Specifically, barcode data (binary pulses) of "00100100100 . . . " is read from the tracks #1 to #5 and #7 to #10.

However, since a stain is present on the track #6, erroneous detection occurs at the part where the stain is present. Specifically, barcode data (binary pulses) of "00100111100 . . . " is read from the track #6.

The barcode data decoding unit 42 reads barcode data from the 10 tracks #1 to #10, thereby storing the cumulative values of the barcode data in the memory 48. The cumulative values include the erroneously detected data due to the stain on the track #6. Thus, the cumulative values including the erroneously detected data at the clock, at which the erroneous detection has occurred, are "1", although these cumulative values should normally be "0".

If the cumulative value of the barcode data is averaged by the averaging unit 50, the cumulative value including the erroneously detected data at the clock, at which the erroneous detection has occurred, becomes smaller. Specifically, the cumulative value "1" is averaged and decreased to "0.1". Thus, the effect of the data that is added by the erroneous detection is dispersed.

The average value "0.1" of the barcode is compared with the preset reference value, for example, "0.5", and barcode data is generated on the basis of the comparison result. Thereby, ultimate barcode data "00100100100 . . . " is decoded. As shown in FIG. 5, from the ultimate barcode data, the erroneously detected data due to the stain is eliminated.

As has been described above, in the optical disc apparatus according to the present embodiment, the objective lens 20 is shifted each time barcode data for one circle is read within the reading range in which the barcode 10b is recorded. Thereby, barcode data is read at a plurality of different track positions. An average value of the barcode data read at the respective tracks is calculated, and barcode data is generated on the basis of the average value. Thus, even if a stain, etc., is present on the barcode 10b and the barcode data read from the track, on which the stain is present, includes erroneously detected data, the effect of the erroneously detected data can be reduced. As a result, the barcode data can exactly be decoded.

In the above description, for the purpose of simplicity, it is assumed that the barcode 10b is read from 10 tracks. The number of tracks, however, is not limited. For example, the acquisition track number may be set in the range of 10 to 20. The acquisition track number data (n), which is set by the controller 28, may not be fixed and may be varied.

In the optical disc apparatus according to the present embodiment, it is assumed that the barcode data is generated by the barcode data decoding unit 42 shown in FIG. 1. However, the barcode data may be generated by the controller 28. Specifically, the controller 28 may generate barcode data according to a barcode generating program, on the basis of barcode data for a plurality of tracks, which is output from the binarizing circuit 40. The controller 28 stores in the memory 48 the barcode data for a plurality of tracks, which is output from the binarizing circuit 40. The controller 28, as shown in FIG. 5, calculates an average value on the basis of the barcode data for plural tracks, which is stored in the memory 48, and generates and outputs the barcode data on the basis of the average value.

In the above description, the objective lens 20 is shifted by the lens actuator 18, thereby reading barcode data on a plurality of tracks. Alternatively, the optical pickup head 14 may be moved by driving the feed motor 16, and thereby the beam spot position of the pickup laser beam 21, which is radiated on the optical disc 10 through the objective lens 20, is varied. Thus, the barcode data may similarly be read from the plural tracks. Moreover, the barcode 10b on the plural tracks may be read by combining the movement of the optical pickup head 14 by the feed motor 16 and the shift of the objective lens 20 by the lens actuator 18.

The process that has been described in connection with the present embodiment may be stored as a computer-executable program in a recording medium such as a magnetic disk (e.g., a flexible disk, a hard disk), an optical disc (e.g., a CD-ROM, a DVD, an HD-DVD) or a semiconductor memory, and may be provided to various apparatuses. The program may be transmitted via communication media and provided to various apparatuses. The computer, which is mounted in various apparatuses, reads the program that is stored in the recording medium or receives the program via the communication media. The operation of the apparatus is controlled by the program, thereby executing the above-described process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc apparatus which reads a barcode recorded on a predetermined area of an optical disc, comprising:
    a reading unit which reads the barcode from a plurality of tracks on the predetermined area of the optical disc by changing a to-be-read track to a subsequent track each time barcode data for one circle of the optical disc is read, the plurality of tracks being in a range that is set by subtracting a tolerance eccentricity amount, which is determined for the optical disc, from a width of the barcode recorded on the predetermined area; and
    a barcode data generating unit which cumulatively adds the barcode data of the plurality of tracks, which is read by the reading unit, calculates an average value of the cumulatively added barcode data, compares the average value with a predetermined reference value, and generates barcode output data.

2. A barcode reading method for reading a barcode recorded on a predetermined area of an optical disc, comprising:
    detecting that the optical disc completes a single rotation;
    reading barcode for one circle of the optical disc, on the basis of the detection of the single rotation;
    changing a track to be next read, each time the barcode for the one circle of the optical disc is read;
    successively accumulating barcode data read from a plurality of tracks in a range that is set by subtracting a tolerance eccentricity amount, which is determined for the optical disc, from a width of the barcode recorded on the predetermined area; and
    comparing an average value of the accumulated barcode data with a predetermined reference value, and generating barcode output data.

* * * * *